(12) United States Patent
Caulfield et al.

(10) Patent No.: US 9,213,547 B2
(45) Date of Patent: Dec. 15, 2015

(54) PROCESSOR AND METHOD FOR PROCESSING INSTRUCTIONS USING AT LEAST ONE PROCESSING PIPELINE

(71) Applicant: ARM LIMITED, Cambridge (GB)

(72) Inventors: Ian Michael Caulfield, Cambridge (GB); Peter Richard Greenhalgh, Cambridge (GB); Max John Batley, Cambridge (GB)

(73) Assignee: ARM Limited, Cambridge (GB)

( * ) Notice: Subject to any disclaimer, the term of this patent is extended or adjusted under 35 U.S.C. 154(b) by 457 days.

(21) Appl. No.: 13/826,553

(22) Filed: Mar. 14, 2013

(65) Prior Publication Data

US 2014/0281423 A1 Sep. 18, 2014

(51) Int. Cl.
*G06F 9/30* (2006.01)
*G06F 9/00* (2006.01)

(52) U.S. Cl.
CPC .................................. *G06F 9/30079* (2013.01)

(58) Field of Classification Search
None
See application file for complete search history.

(56) References Cited

U.S. PATENT DOCUMENTS

2011/0138124 A1* 6/2011 Hill et al. ...................... 711/122
2013/0318107 A1* 11/2013 Asaad et al. .................. 707/755

* cited by examiner

*Primary Examiner* — Scott Sun
(74) *Attorney, Agent, or Firm* — Nixon & Vanderhye P.C.

(57) ABSTRACT

A processor has a processing pipeline with first, second and third stages. An instruction at the first stage takes fewer cycles to reach the second stage then the third stage. The second and third stages each have a duplicated processing resource. For a pending instruction which requires the duplicated resource and can be processed using the duplicated resource at either of the second and third stages, the first stage determines whether a required operand would be available when the pending instruction would reach the second stage. If the operand would be available, then the pending instruction is processed using the duplicated resource at the second stage, while if the operand would not be available in time then the instruction is processed using the duplicated resource in the third pipeline stage. This technique helps to reduce delays caused by data dependency hazards.

18 Claims, 6 Drawing Sheets

ADD r1, r1, r2
SUB r3, r4, r1, LSL#2

|   | Iss | Ex1 | Ex 2 |
|---|-----|-----|------|
| 0 | ADD |     |      |
| 1 | SUB | ADD |      |
| 2 |     | SUB | ADD (forward r1) |
| 3 |     |     | SUB  |

FIG. 4

ORR r2, r5, r6, LSL#2
ADD r1, r1, r2
SUB r7, r8, r3, LSL#2

|   | Iss | Ex1 | Ex 2 |
|---|-----|-----|------|
| 0 | ORR |     |      |
| 1 | ADD | ORR |      |
| 2 | ADD |     | ORR  |
| 3 | SUB | ADD | (forward r2) |
| 4 |     | SUB | ADD  |
| 5 | stall (r2, not available) |     | SUB  |

FIG. 5

PROCESSOR AND METHOD FOR PROCESSING INSTRUCTIONS USING AT LEAST ONE PROCESSING PIPELINE

BACKGROUND TO THE INVENTION

1. Field of the Invention

The present invention relates to the field of data processing. More particularly, the invention relates to controlling the processing of instructions using at least one processing pipeline.

2. Background to the Invention

In a processor, data dependencies may cause a delay in processing instructions. An earlier instruction may generate an operand value which is required for a later instruction to be processed, and so the later instruction cannot be executed until the earlier instruction has been executed. One technique for reducing the delay caused by data dependencies is out-of-order processing, in which the order in which instructions are executed is dynamically varied by the processor. If the next instruction of a program cannot be executed because of a data dependency, another instruction which does not have the data dependency can be executed first, reducing the number of cycles when processing is stalled. This allows the program as a whole to be executed more quickly. However, the processing resources required to support out-of-order processing can be complex and may incur some cost in terms of circuit area and power consumption. For example, the pipeline may be required to track which instructions have been executed and temporarily store the results of already completed instructions while earlier instructions in the original program order are still pending. Therefore, it is desirable to provide a technique for reducing the delay caused by the data dependencies without requiring out-of-order processing.

SUMMARY OF THE INVENTION

Viewed from one aspect, the present invention provides a processor comprising:

at least one processing pipeline configured to process instructions, the at least one processing pipeline comprising a first pipeline stage, a second pipeline stage and a third pipeline stage; wherein:

an instruction at the first pipeline stage requires fewer processing cycles to reach the second pipeline stage than to reach the third pipeline stage;

the second pipeline stage and the third pipeline stage each comprise a duplicated processing resource;

the first pipeline stage is configured to determine, for a pending instruction which requires the duplicated processing resource and can be processed using the duplicated processing resource in any of the second pipeline stage and the third pipeline stage, whether an operand required for said pending instruction would be available at a time when the pending instruction would reach the second pipeline stage;

if the operand for said pending instruction would be available at said time, then the first pipeline stage is configured to control the at least one processing pipeline to process said pending instruction using the duplicated processing resource in the second pipeline stage; and if the operand for said pending instruction would not be available at said time, then the first pipeline stage is configured to control the at least one processing pipeline to process said pending instruction using the duplicated processing resource in the third pipeline stage.

Some processors may have one or more processing pipelines in which the same processing resource appears at different stages within the one or more pipelines. This duplication can be exploited to reduce the delays caused by data dependency hazards. One would think that for optimum performance it would generally be desirable to process an instruction using the duplicated resource at the earliest possible point in the pipeline so that the result will be available most quickly. However, the inventors of the present technique recognized that this approach does not always produce the best performance since it can cause delays to subsequent instructions if the current instruction is waiting for an operand to become available.

One or more pipelines may have first, second and third pipeline stages, where the second and third pipeline stages each have a duplicated resource and the delay associated with processing an instruction in the third pipeline stage is greater than for the second pipeline stage. The first pipeline stage controls which of the duplicated resources is used for an instruction which can be processed using either of the duplicated resources. The first pipeline stage may determine, for a pending instruction which can be processed using the duplicated resource in either the second pipeline stage or the third pipeline stage, whether an operand required for the pending instruction would be available in time for the pending instruction to reach the second pipeline stage. If the operand would be available by the time the instruction reaches the second pipeline stage, then the first pipeline stage may control the pipeline to process the instruction using the duplicated resource in the second pipeline stage. If the operand would not be available in time for the second pipeline stage, then the pipeline may be controlled to process the instruction using the duplicated resource in the third pipeline stage.

This makes use of the time required for waiting for the operand to become available to progress the pending instruction down the pipeline to the third pipeline stage. By keeping the pending instruction moving down the pipeline, other instructions can follow and so the delay to these other instructions can be reduced. Also, by using the later third pipeline stage to process the pending instruction if its operand will not be ready in time for the second pipeline stage, the duplicated resource in the second pipeline stage which can yield a result more quickly becomes available for other instructions. Therefore, counter-intuitively processing each pending instruction at the earliest possible point in the pipeline does not provide the best overall performance, and instead sending the introduction further down the pipeline when an operand will not be available in time can improve the overall performance of the processor when processing a sequence of instructions.

This technique may be applied to an out-of-order processor to provide a further improvement to instruction scheduling in addition to the ability to change the order in which instructions are executed.

However, the present technique is particularly useful in an in-order processor in which it is not possible to change the order in which instructions are issued for execution. In an in-order processor, blocking of one instruction due to its operand not being available can significantly delay the processing of subsequent instructions since it is not possible for subsequent instructions to be executed ahead of an earlier instruction in the program order. The present technique allows the pending instruction which is waiting for an operand to be sent deeper down the pipeline, allowing other instructions to be processed at earlier pipeline stages. This can reduce the number of cycles in which certain pipeline stages are inactive in an in-order processor and hence increase the number of instructions which can be executed in a given time.

The determination of which of the duplicated resources in the second or third pipeline stages should process the pending instruction is made by the first pipeline stage. The first pipeline stage may be an issue stage for issuing instructions. For example, the issue stage may receive decoded instructions from a decode stage and may select whether to issue instructions requiring the duplicated resource to a processing path including the duplicated resource in the second pipeline stage or a processing path including the duplicated resource in the third pipeline stage.

Also, the first pipeline stage may comprise a decode stage for decoding instructions. For example, the decode stage may add an indication to the decoded instruction identifying which of the duplicated resources in the second and third pipeline stages should be used to process the instruction. A subsequent issue stage may then issue the instruction to an appropriate processing path identified by the indication added by the decode stage.

The first pipeline stage may determine whether the operand may be available in time in different ways. Sometimes, the operand may already be available when the instruction is at the first pipeline stage and so in this case the instruction may be sent for processing by the duplicated processing resource in the second processing stage. On other occasions, the operand may not yet be available at the first pipeline stage but the first pipeline stage may determine that an earlier instruction which is in flight in the pipeline will generate the required operand before the pending instruction reaches the second processing stage. In this case, the pending instruction may again be issued for processing by the duplicated resource in the second pipeline stage. On the other hand, if an earlier instruction generating the required operand will not have completed by the time the pending instruction would reach the second pipeline stage, then the third pipeline stage can be used to provide the required duplicated processing resource.

The second and third pipeline stages may be implemented in different ways. In one example, the second and third pipeline stages may be respective stages of the same processing pipeline. Instructions to be processed in the third pipeline stage may pass through the second pipeline stage to reach the third pipeline stage. By sending the pending instruction to the third pipeline stage when it cannot be processed in time at the second pipeline stage, this makes the second pipeline stage available to process subsequent instructions earlier than if the pending instruction had been sent to be processed at the second pipeline stage and stalled at the second pipeline stage waiting for the operand.

Alternatively, the second pipeline stage and third pipeline stage may belong to different processing pipelines. If the required operand is available in time, then the pending instruction can be processed faster using the pipeline including the second pipeline stage than the pipeline including the third pipeline stage. However, if the operand is not available in time for this, then sending the pending instruction to the pipeline including the third pipeline stage enables the pipeline including the second pipeline stage to process other instructions more quickly.

The present technique may be particularly useful if the processing pipeline including the second processing stage also comprises a non-duplicated processing resource. Sending the pending instruction to the third pipeline stage at a later point in the one or more pipelines may free the non-duplicated processing resource for use by other instructions, which may not have been possible if the pending instruction was stalled at the second pipeline stage while waiting for an operand.

In one example, the non-duplicated processing resource may be included in the second processing stage so that if the pending instruction was stalled at the second processing stage then this would prevent other instructions using the non-duplicated processing resource. By progressing the pending instruction to the third pipeline stage while waiting for a required operand to become available, the non-duplicated resource may become available earlier for use by other instructions, reducing the delay in processing.

A bypass path may be provided for allowing the pending instruction to bypass the non-duplicated resource when it is forwarded for processing at the third pipeline stage.

The pending instruction which can be processed using the duplicated resource in either the second pipeline stage or the third pipeline stage may be an instruction not requiring the non-duplicated processing resource. For instructions which do require the non-duplicated processing resource, the processing may have to take place using a particular processing path. The present technique can be used to improve scheduling of instructions not requiring the non-duplicated processing resource for which there is a choice of paths available.

In some examples, there may be two instances of the duplicated resource. In other examples, three or more instances of the duplicated resource may be provided. In this case, the first pipeline stage may control the pipeline to process the pending instruction using the duplicated resource in the earliest pipeline stage for which the required operand would be available at the time when the pending instruction would reach that pipeline stage. If the operand would not be available in time for the pending instruction reaching any of the pipeline stages including a duplicated resource, then the pending instruction can be sent for processing by the duplicated resource in the latest of these pipeline stages.

The duplicated and non-duplicated resources may comprise any kind of circuitry for processing instructions. For example, the duplicated processing resource may comprise an arithmetic logic unit (ALU) for performing arithmetic and logical operations on data values in response to program instructions. Multiple ALUs may be provided at different locations within a pipeline or in different pipelines and so this duplication can be exploited using the present technique to reduce the delay caused by data dependency hazards.

An example of a non-duplicated processing resource may be a shifter for performing a shift operation. Hence, operations which require a shift to be performed would have to be processed using the non-duplicated shifter, while operations not requiring the shifter may be selectively processed using the duplicated resource in either the second or third processing stages. Alternatively the shifter may itself be duplicated and some other circuit may not be duplicated.

Also, the duplicated processing resource need not actually carry out any processing on the instruction. The duplicated processing resource may be an input for inputting an operand value into a pipeline stage, for example. This can be useful for a MOV instruction for example, which moves a value from one register to another register. The operand from the first register may be input at one stage of the pipeline and may be forwarded to the end of the pipeline without any further processing of the operand. At the end of the pipeline, a write-back stage may write the operand to a second register. The operand may be generated by an earlier instruction and there may be a choice of which point of the pipeline the operand is input. By progressing the MOV instruction down the pipeline if the operand is not yet available so that the operand is input at a later stage of the pipeline, this can allow other instructions to be processed at earlier stages of the pipeline at an earlier time than if the MOV instruction had been stalled while waiting for the operand.

The operand which is required for the pending instruction may be an operand which is generated by another instruction issued for processing in an earlier processing cycle than the pending instruction.

Viewed from another aspect, the present invention provides a processor comprising:

at least one processing pipeline means for processing instructions, the at least one processing pipeline means comprising a first pipeline stage means for processing instructions, a second pipeline stage means for processing instructions and a third pipeline stage means for processing instructions; wherein:

an instruction at the first pipeline stage means requires fewer processing cycles to reach the second pipeline stage means than to reach the third pipeline stage means;

the second pipeline stage means and the third pipeline stage means each comprise a duplicated processing means for providing a processing function;

the first pipeline stage means is configured to determine, for a pending instruction which requires the duplicated processing means and can be processed using the duplicated processing means in any of the second pipeline stage means and the third pipeline stage means, whether an operand required for said pending instruction would be available at a time when the pending instruction would reach the second pipeline stage means;

if the operand for said pending instruction would be available at said time, then the first pipeline stage means is configured to control the at least one processing pipeline means to process said pending instruction using the duplicated processing means in the second pipeline stage means; and if the operand for said pending instruction would not be available at said time, then the first pipeline stage means is configured to control the at least one processing pipeline means to process said pending instruction using the duplicated processing means in the third pipeline stage means.

Viewed from a further aspect, the present invention provides a method of processing instructions using a processor comprising at least one processing pipeline configured to process instructions, the at least one processing pipeline comprising a first pipeline stage, a second pipeline stage and a third pipeline stage, wherein an instruction at the first pipeline stage requires fewer processing cycles to reach the second pipeline stage than to reach the third pipeline stage, and the second pipeline stage and the third pipeline stage each comprise a duplicated processing resource;

the method comprising:

determining at the first pipeline stage, for a pending instruction which requires the duplicated processing resource and can be processed using the duplicated processing resource in any of the second pipeline stage and the third pipeline stage, whether an operand required for said pending instruction would be available at a time when the pending instruction would reach the second pipeline stage;

if the operand for said pending instruction would be available at said time, controlling the at least one processing pipeline to process said pending instruction using the duplicated processing resource in the second pipeline stage; and if the operand for said pending instruction would not be available at said time, controlling the at least one processing pipeline to process said pending instruction using the duplicated processing resource in the third pipeline stage.

Viewed from another aspect, the present invention provides a non-transitory computer-readable storage medium storing at least one computer program which, when executed on a computer controls the computer to provide a virtual machine environment corresponding to the processor described above.

Viewed from another aspect, the present invention provides a non-transitory computer-readable storage medium storing at least one computer program which, when executed on a computer controls the computer to provide a virtual machine environment for performing the method described above.

A virtual machine may be implemented by at least one computer program which, when executed on a computer, controls the computer to behave as if it was a processor having one or more pipelines as discussed above, so that instructions executed on the computer are executed as if they were executed on the processor. A virtual machine environment allows a native system to execute non-native code by running a virtual machine corresponding to the non-native system for which the non-native code was designed. Hence, in the virtual machine environment the virtual machine program may control whether the pending instruction should be processed using a virtual duplicated resource in a virtual second pipeline stage or a virtual duplicated resource in a virtual third pipeline stage using the technique discussed above.

The above, and other objects, features and advantages of this invention will be apparent from the following detailed description of illustrative embodiments, which is to be read in connection with the accompanying drawings.

BRIEF DESCRIPTION OF THE DRAWINGS

FIG. 4 shows an example of executing the instructions shown in FIG. 2 using the pipeline of FIG. 3;

FIG. 5 shows a comparative example of executing another sequence of instructions with a data dependency hazard;

DESCRIPTION OF EXAMPLE EMBODIMENTS

Figure 1:
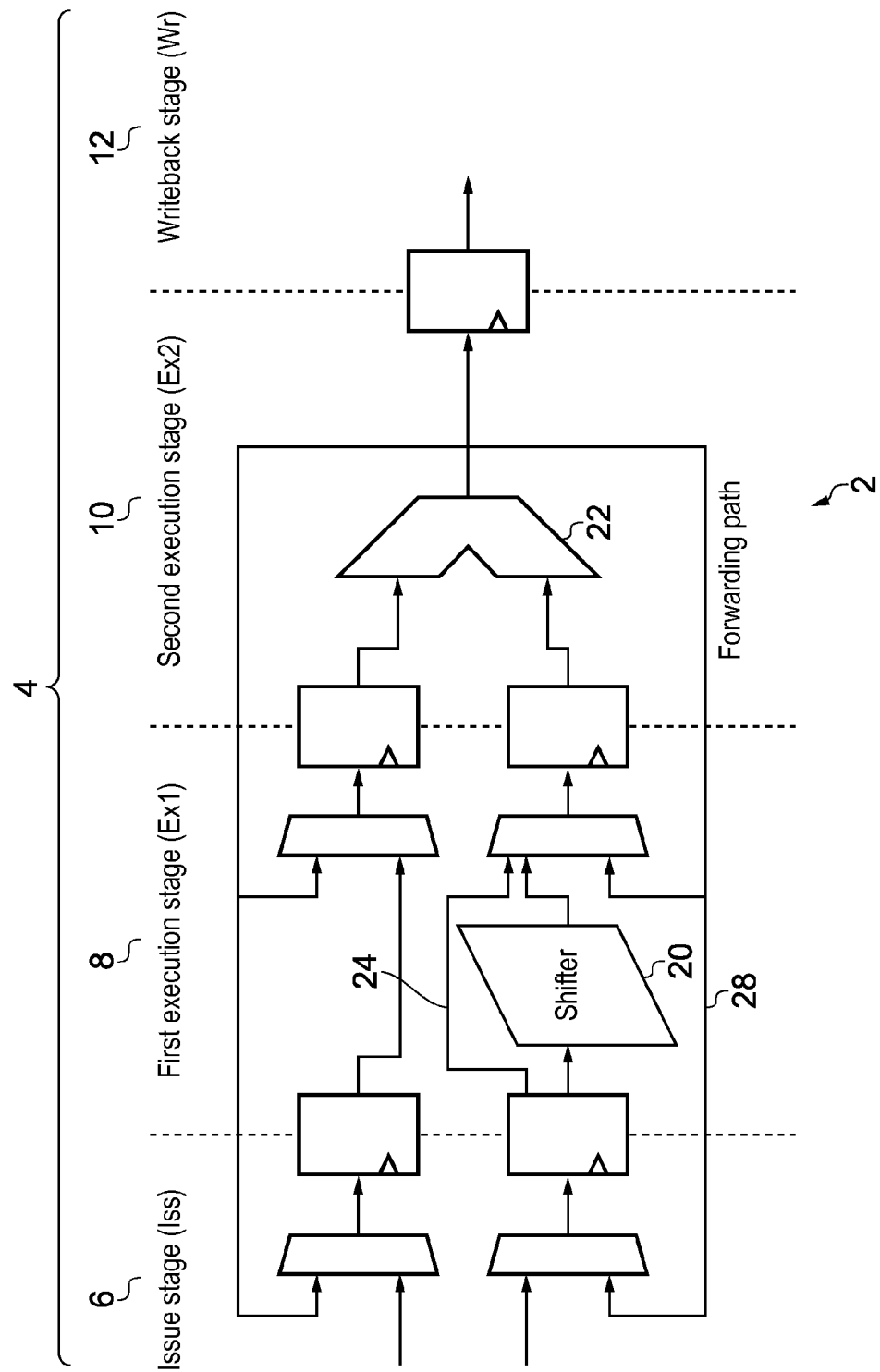
FIG. 1 illustrates a first example of a processing pipeline.

FIG. 1 shows an example of a portion of a data processing apparatus 2 having a processing pipeline 4. The pipeline 4 includes an issue stage 6, a first execution stage 8, a second execution stage 10 and a write back stage 12. The issue stage 6 issues instructions for execution by the first and second execution stages 8, 10. Results of execution are written back to registers by the write back stage 12. It will be appreciated that the processor 2 and the pipeline 4 may include other elements not shown in FIG. 1.

In this example, the first execution stage 8 includes a barrel shifter 20 for performing shift operations and the second execution stage 10 includes an arithmetic logic unit (ALU) 22 for performing arithmetic operations such as addition, subtraction and multiplication and logical operations such as AND, OR and XOR operations. The first execution stage 8 also has a bypass path 24 for bypassing the shifter 20 so that instructions which do not require a shift operation can progress directly to the ALU 22 in the second execution stage 10.

Figure 2:
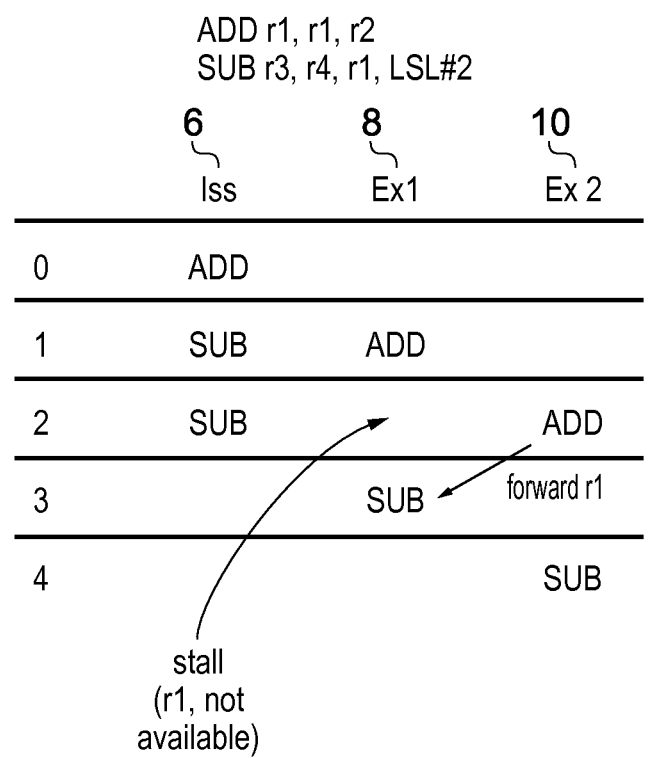
FIG. 2 illustrates an example of a delay caused by a data dependency when processing instructions using the pipeline of FIG. 1.

FIG. 2 shows an example of a data dependency causing a delay in processing instructions using the pipeline shown in FIG. 1. In the example shown in FIG. 2, an ADD instruction not requiring a shift operation is followed by an SUB instruction which requires a left shift operation to be performed (indicated by LSL in FIG. 2) and which requires an operand r1 generated by the ADD instruction. In processing cycle 0 the ADD instruction is at the issue stage 6. In processing cycle 1, the ADD instruction progresses through the bypass path 24 of the first execution stage 8 while the SUB instruction is at the issue stage 6. In processing cycle 2, the ADD instruction reaches the second execution stage 10 where the ALU 22 performs the addition. However, the SUB instruction is stalled at the issue stage 6 because its operand r1 has not yet been generated by the ALU 22 in the second execution stage 10. As the operand r1 is generated in processing cycle 2 by ALU 22, the SUB instruction cannot use the operand r1 until processing cycle 3. A forwarding path 28 is provided for forwarding the operand generated by ALU 22 to the input of first execution stage 8 without requiring the operand to be written to a register in the meantime. This allows the SUB instruction to use the operand r1 when it is issued to the first execution stage 8 in processing cycle 3. The SUB instruction moves on to the second execution stage 10 in processing cycle 4 where the subtraction is performed by ALU 22.

As shown in FIG. 2, the data dependency has caused a delay in processing the SUB instruction, and in processing cycle 2 no instruction was processed by the first execution stage 8. Processing would be more efficient if an instruction could be input to the first execution stage 8 in each processing cycle, avoiding a bubble in the pipeline as shown in FIG. 2.

Figure 3:
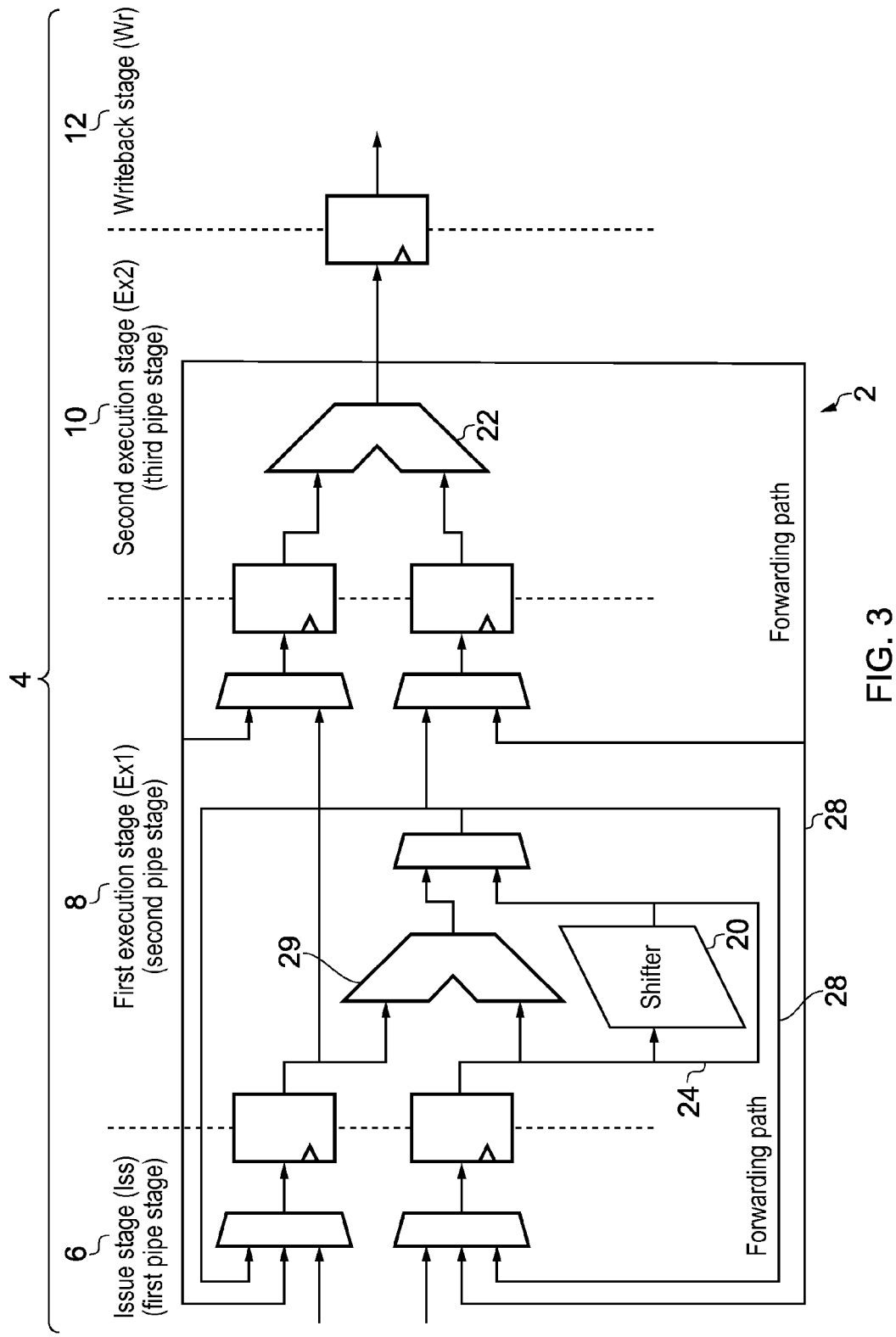
FIG. 3 schematically illustrates an example of a processing pipeline for implementing the present technique.

FIG. 3 shows an example of a pipeline. Elements which are the same as in FIG. 1 are shown with the same reference numerals. Again the pipeline 4 has an issue stage 6, two execution stages 8, 10 and a writeback stage 12. In FIG. 3, the first execution stage 8 is provided with a second ALU 29 which duplicates the ALU 22 in the second execution stage 10. Since the ALU is duplicated at different points of the pipeline, instructions which require an ALU operation but do not require a shift may be processed by the ALU 29 at the first execution stage 8 instead of the second execution stage 10 so that the result will be available earlier. Instructions which require a shift and an ALU operation to be performed would be processed using the shifter 20 in the first execution stage 8 and the ALU 22 in the second execution stage 10.

FIG. 4 shows the same sequence of instructions as in FIG. 2 when processed using the pipeline of FIG. 3. This time, since the ADD instruction which does not require a shift can be processed using the ALU 29 in to the first execution stage 8, the stall shown in FIG. 2 can be avoided. The result of the ADD instruction becomes available in processing cycle 1 and the output of the ALU 29 can be forwarded back to the input of the first execution stage 8 using another forwarding path 28 so that the SUB instruction can use this value in the following cycle 2 at execution stage 1. This allows the SUB instruction to be completed a cycle earlier than shown in FIG. 2.

However, if instructions which do not require a shift operation are always processed by the ALU 22 in the first execution stage 8, then stalls caused by data dependency hazards may still occur, as shown in the example FIG. 5. In this example an ORR instruction which requires a shift is executed, followed by an ADD instruction not requiring a shift which requires the operand r2 generated by the ORR instruction, and a SUB instruction requiring a shift which does not rely on the operands r2, r1 generated by the ORR and ADD instructions. In processing cycle 0, the ORR instruction is at the issue stage 6. In processing cycle 1, the ORR instruction is issued to the first execution stage 8 where the shifter 20 performs the left shift operation, and meanwhile the ADD instruction is at the issue stage. In processing cycle 2, the ORR instruction progresses to the second execution stage 10 for the OR operation to be performed by ALU 22, but the ADD instruction must wait for the outcome of the ORR instruction and so is stalled. The ADD instruction cannot be processed until processing cycle 3 when the operand r2 generated by the ORR instruction is available and the ADD instruction can now be processed using the ALU 29 in the first execution stage 8. The SUB instruction follows the ADD instruction and can be processed by shifter 20 in the cycle 4 following the ADD instruction because the SUB instruction is not dependent on an earlier instruction. FIG. 5 shows that again a stall may occur, as no instruction was processed by the first execution stage 8 in processing cycle 2.

This delay can be reduced by controlling instructions which require an ALU operation but do not require a shift so that they are sometimes handled by the ALU 22 in the second execution stage 10 and are sometimes handled by the ALU 29 in the first execution stage 8. This is counterintuitive since one would expect that it would be desirable to process instructions at the earliest possible point of the pipeline.

Figures 6, 7:
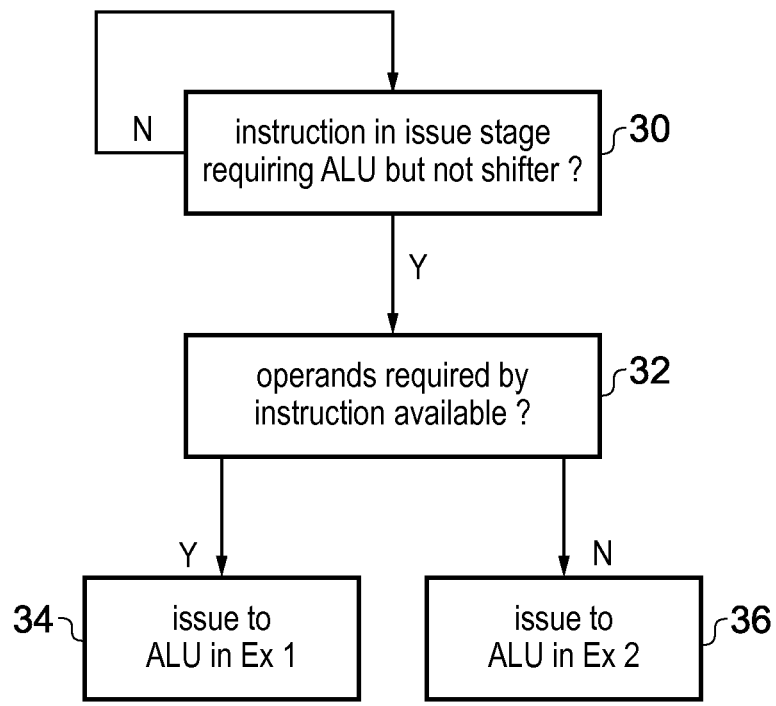
FIG. 6 illustrates a method of controlling processing of the instructions.
FIG. 7 shows an example of controlling execution of the sequence of instructions of FIG. 5 using the method of FIG. 6.

FIG. 6 shows a method of controlling instruction processing using the present technique in the pipeline shown in FIG. 3. At step 30, the method detects an instruction in the issue stage 6 which requires an ALU operation but does not require a shift (e.g. the ADD instruction shown in FIG. 5). If such an instruction is detected, then at step 32 the issue stage 6 determines whether any operands required by this instruction would be available by the time the instruction would reach the first execution stage 8. If the required operand(s) would be available by this time then at step 34 the instruction is issued to the first execution stage 8 be processed by the ALU 29 in the first execution stage 8. If a required operand would not be available in time for the first execution stage 8, then at step 36 the issue stage 6 issues the instruction along the bypass path 24 of the first execution stage 8, to be processed by the ALU 22 in the second execution stage 10.

More generally, where there is some circuitry in the pipeline which is duplicated at different pipeline stages, if a required operand for an instruction which could be processed using any instance of the duplicated circuitry would not be ready in time for the duplicated circuitry in the earlier pipeline stage, then it is processed using the duplicated circuitry in a later pipeline stage. On the other hand, if the operand would be ready in time then the duplicated circuitry in the earlier pipeline stage can be used.

To demonstrate how the method of FIG. 6 can improve processing performance, FIG. 7 shows the same example sequence of instructions in FIG. 5, but in which issuing is controlled according to the method of FIG. 6. The ORR instruction which requires both the shifter 20 and the ALU 22 of the second execution stage 10 is processed in the same way as shown in FIG. 5. However, the ADD instruction requires only the ALU 22 or 29 and does not require the shifter 20. Hence, according to steps 30 and 32 of FIG. 6, the issue stage 6 determines that if the ADD instruction was issued to the first execution stage 8 in cycle 2, the operand r2 generated by the ORR instruction would not be ready in time since the ORR instruction will not generate the operand value until the end of processing cycle 2 (too late for the ADD instruction to be processed in processing cycle 2). Therefore, according to step 36 the ADD instruction is issued along the bypass path 24 so that it will not be processed by the ALU 22 until cycle 3 in the second execution stage 10 by which time the outcome of the ORR instruction is ready. The subsequent SUB instruction can now be issued to the first execution stage 8 in processing cycle 3 because the ADD instruction has already moved on to the second execution stage 10.

In FIG. 7, the ADD instruction produced a result in the same cycle as in FIG. 5, while the SUB instruction produced a result one cycle earlier than in FIG. 5 (cycle 4 instead of cycle 5). This is because the time required for waiting for the operand r2 for the ADD instruction to be ready has been used to progress the ADD instruction down the pipeline, making space for the SUB instruction to be processed in the first execution stage 8. By processing the add instruction using the later of the ALUs 22, 29 when the ADD instruction is being delayed anyway while waiting for an operand to become available, the processing of the SUB instruction is accelerated without slowing down execution of the ADD instruction. Therefore, the overall performance is improved.

The method of FIG. 6 may not always allow data dependency delays to be eliminated. There may be some data dependencies which will cause a delay irrespective of which instance of the duplicated resource is selected for processing a pending instruction. Nevertheless, for a series of instructions the present technique allows at least some of the delays caused by data dependencies to be avoided, reducing the average time for executing an instruction and improving overall performance.

Figure 8:
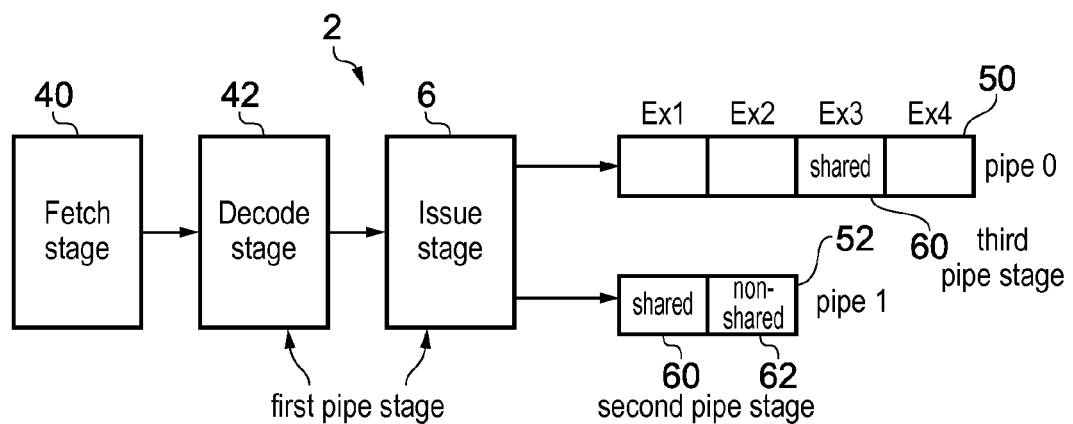
FIG. 8 shows an example of a processor having multiple processing pipelines in which the present technique may be used.

FIG. 8 shows another example to which the present technique can be applied. In FIG. 8, the data processing apparatus has a fetch stage 40 for fetching instructions from memory, a decode stage 42 for decoding instructions, an issue stage 6 for issuing instructions for execution and multiple execution pipelines 50, 52 for executing instructions. The execution pipelines 50, 52 may have different numbers of stages. The first pipeline 50 and the second pipeline 52 may each have a stage 60 with duplicated circuitry, such as an ALU or other processing circuitry. One of the pipelines 52 may also have a stage 62 with non-shared circuitry which is unique to that pipeline. If an instruction requires the non-shared circuitry, then it would be sent to pipeline 52 for execution. If an instruction does not require the non-shared circuitry and can be executed by the shared circuitry in either of the pipelines 50, 52, then it can be sent to the pipeline 52 if its operands will be ready in time for the stage including the shared circuitry 60 (allowing quicker processing of this instruction), and may be sent to the pipeline 50 if its operand would not be ready in time for the shared circuitry 60 in the other pipeline 52 (allowing the time required for waiting for this operand to be used to progress the instruction down the pipeline, freeing the non-shared circuitry in the other pipeline 52 for use by other instructions).

In the examples described above, the issue stage 6 determines which instance of the duplicated circuitry should be used to process the pending instruction. However, this determination may also take place at the decode stage 42. For example, the decode stage 42 may append a bit to the encoding of a decoded instruction to indicate to the issue stage 6 which pipeline stage or which pipeline should be used to process the instruction using the duplicated circuitry. Alternatively, other pipeline stages could determine how an instruction should be processed.

Also, the examples above have described an in-order processor in which instructions must be executed in the same order in which they appear in the program being executed. However, the technique could also be applied to an out-of-order processor in which execution order can be dynamically scheduled depending on when required operands become available. While varying the order of execution would usually be the main technique for resolving data dependency issues in an out-of-order processor, in cases where a pending instruction is waiting for operands to become available and there is no other instruction which could be issued first, then the present technique could be used to progress the pending instruction down the pipeline so that once its operand is available then other instructions can use earlier stages in the pipeline.

Figure 9:
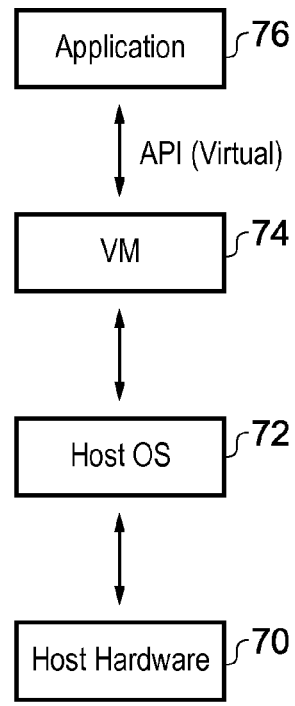
FIG. 9 shows an example of a virtual machine implementation of the present technique.

FIG. 9 illustrates a virtual machine implementation in which the present invention may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 70 typically running a host operating system 72 supporting a virtual machine program 74. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 74 is capable of executing an application program (or operating system) 76 to give the same results as would be given by execution of the program 76 by a real hardware device. Thus, execution of program instructions may be controlled from within the application program 76 using the virtual machine program 74, with the virtual machine program 74 simulating one or more processing pipelines as discussed above with duplicated resources in different pipeline stages and instructions requiring the duplicated resource being executing using one of the duplicated resources selected using the method discussed above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:
1. A processor comprising:
at least one processing pipeline configured to process instructions, the at least one processing pipeline comprising a first pipeline stage, a second pipeline stage and a third pipeline stage; wherein:
an instruction at the first pipeline stage requires fewer processing cycles to reach the second pipeline stage than to reach the third pipeline stage;
the second pipeline stage and the third pipeline stage each comprise a duplicated processing resource;
the first pipeline stage is configured to determine, for a pending instruction which requires the duplicated processing resource and can be processed using the duplicated processing resource in any of the second pipeline stage and the third pipeline stage, whether an operand required for said pending instruction would be available at a time when the pending instruction would reach the second pipeline stage;
if the operand for said pending instruction would be available at said time, then the first pipeline stage is configured to control the at least one processing pipeline to process said pending instruction using the duplicated processing resource in the second pipeline stage; and if the operand for said pending instruction would not be available at said time, then the first pipeline stage is configured to control the at least one processing pipeline to process said pending instruction using the duplicated processing resource in the third pipeline stage.

2. The processor according to claim 1, wherein the processor is an in-order processor.

3. The processor according to claim 2, wherein the at least one processing pipeline is configured to process a sequence of program instructions having a predetermined program order; and the at least one processing pipeline comprises an issue stage configured to issue instructions for processing in the same order as the predetermined program order.

4. The processor according to claim 1, wherein the first pipeline stage comprises an issue stage configured to issue instructions for processing by the at least one processing pipeline.

5. The processor according to claim 1, wherein the first pipeline stage comprises a decode stage configured to decode instructions to be processed by the at least one processing pipeline.

6. The processor according to claim 1, wherein the second pipeline stage and the third pipeline stage are respective stages of the same processing pipeline.

7. The processor according to claim 1, wherein the second pipeline stage and the third pipeline stage are stages of different processing pipelines.

8. The processor according to claim 1, wherein the processing pipeline including the second processing stage also comprises a non-duplicated processing resource.

9. The processor according to claim 8, wherein the second processing stage comprises the non-duplicated processing resource.

10. The processor according to claim 8, wherein the processing pipeline including the second processing stage comprises a bypass path for bypassing the non-duplicated processing resource.

11. The processor according to claim 8, wherein said pending instruction comprises an instruction not requiring the non-duplicated processing resource.

12. The processor according to claim 1, wherein the duplicated processing resource comprises an arithmetic logic unit configured to perform arithmetic and logical operations.

13. The processor according to claim 8, wherein the non-duplicated processing resource comprises a shifter configured to perform a shift operation.

14. The processor according to claim 1, wherein said operand required for said pending instruction comprises an operand generated by another instruction issued in an earlier processing cycle than said pending instruction.

15. A processor comprising:
at least one processing pipeline means for processing instructions, the at least one processing pipeline means comprising a first pipeline stage means for processing instructions, a second pipeline stage means for processing instructions and a third pipeline stage means for processing instructions; wherein:
an instruction at the first pipeline stage means requires fewer processing cycles to reach the second pipeline stage means than to reach the third pipeline stage means;
the second pipeline stage means and the third pipeline stage means each comprise a duplicated processing means for providing a processing function;
the first pipeline stage means is configured to determine, for a pending instruction which requires the duplicated processing means and can be processed using the duplicated processing means in any of the second pipeline stage means and the third pipeline stage means, whether an operand required for said pending instruction would be available at a time when the pending instruction would reach the second pipeline stage means;
if the operand for said pending instruction would be available at said time, then the first pipeline stage means is configured to control the at least one processing pipeline means to process said pending instruction using the duplicated processing means in the second pipeline stage means; and
if the operand for said pending instruction would not be available at said time, then the first pipeline stage means is configured to control the at least one processing pipeline means to process said pending instruction using the duplicated processing means in the third pipeline stage means.

16. A method of processing instructions using a processor comprising at least one processing pipeline configured to process instructions, the at least one processing pipeline comprising a first pipeline stage, a second pipeline stage and a third pipeline stage, wherein an instruction at the first pipeline stage requires fewer processing cycles to reach the second pipeline stage than to reach the third pipeline stage, and the second pipeline stage and the third pipeline stage each comprise a duplicated processing resource;
the method comprising:
determining at the first pipeline stage, for a pending instruction which requires the duplicated processing resource and can be processed using the duplicated processing resource in any of the second pipeline stage and the third pipeline stage, whether an operand required for said pending instruction would be available at a time when the pending instruction would reach the second pipeline stage;
if the operand for said pending instruction would be available at said time, controlling the at least one processing pipeline to process said pending instruction using the duplicated processing resource in the second pipeline stage; and
if the operand for said pending instruction would not be available at said time, controlling the at least one processing pipeline to process said pending instruction using the duplicated processing resource in the third pipeline stage.

17. A non-transitory computer-readable storage medium storing at least one computer program which, when executed on a computer controls the computer to provide a virtual machine environment corresponding to the processor of claim 1.

18. A non-transitory computer-readable storage medium storing at least one computer program which, when executed on a computer controls the computer to provide a virtual machine environment for performing the method of claim 16.

* * * * *